(12) United States Patent
Yue et al.

(10) Patent No.: US 10,522,834 B2
(45) Date of Patent: Dec. 31, 2019

(54) MULTIPLE-ELEMENT COMPOSITE MATERIAL FOR ANODES, PREPARATION METHOD THEREFOR, AND LITHIUM-ION BATTERY HAVING SAME

(71) Applicant: SHENZHEN BTR NEW ENERGY MATERIALS INC., Shenzhen, Guangdong (CN)

(72) Inventors: Min Yue, Shenzhen (CN); Peng He, Shenzhen (CN); Sheng Li, Shenzhen (CN); Jianguo Ren, Shenzhen (CN); Youyuan Huang, Shenzhen (CN)

(73) Assignee: Shenzhen BTR New Energy Materials Inc., Shenzhen, Guangdong (CN)

( * ) Notice: Subject to any disclaimer, the term of this patent is extended or adjusted under 35 U.S.C. 154(b) by 248 days.

(21) Appl. No.: 15/326,829

(22) PCT Filed: Aug. 17, 2015

(86) PCT No.: PCT/CN2015/087266
§ 371 (c)(1),
(2) Date: Jan. 17, 2017

(87) PCT Pub. No.: WO2016/008455
PCT Pub. Date: Jan. 21, 2016

(65) Prior Publication Data
US 2017/0207457 A1    Jul. 20, 2017

(30) Foreign Application Priority Data
Jul. 17, 2014    (CN) .......................... 2014 1 0340471

(51) Int. Cl.
*H01M 4/583*    (2010.01)
*H01M 10/0525*    (2010.01)
(Continued)

(52) U.S. Cl.
CPC ............. *H01M 4/583* (2013.01); *B01J 13/04* (2013.01); *C22F 1/02* (2013.01); *C22F 1/16* (2013.01);
(Continued)

(58) Field of Classification Search
CPC ........... H01M 10/0525; H01M 4/0404; H01M 4/0421; H01M 4/0471; H01M 4/049;
(Continued)

(56) References Cited

U.S. PATENT DOCUMENTS

2006/0093909 A1\* 5/2006 Zhang ................... H01M 4/244
429/209
2010/0176337 A1\* 7/2010 Zhamu ................ H01M 4/1391
252/182.1

(Continued)

FOREIGN PATENT DOCUMENTS

CN    102185142 A    9/2011
CN    103238238 A    8/2013
(Continued)

OTHER PUBLICATIONS

Scientific and Technical Information Center (STIC) search results from S. Segal (Year: 2018).\*
(Continued)

*Primary Examiner* — Stewart A Fraser
*Assistant Examiner* — Victoria H Lynch
(74) *Attorney, Agent, or Firm* — Sandberg Phoenix & von Gontard, P.C.

(57) ABSTRACT

A multiple-element composite material for negative electrodes, a preparation method therefor, and a lithium-ion battery using the negative electrode material. The lithium-ion battery uses multiple-element composite material for negative electrodes has a core-shell structure containing multiple shell layers. The inner core consists of graphite and
(Continued)

nano-active matter coating the surface of the graphite. The outer layers of the inner core are in order: the first shell layer is of an electrically conductive carbon material, the second shell layer is of a nano-active matter, and the third shell layer is an electrically conductive carbon material coating layer. The multiple-element composite material for negative electrodes of the present invention combines coating processing technology with surface composite modification and coating modification technology to successfully prepare a multiple-element composite material for negative electrodes having a core-shell structure containing multiple shell layers, and allows for high load and high dispersion for the nano-active matter, thereby substantially enhancing the material specific capacity, cycle performance, and initial efficiency. Additionally, the multiple-element composite material for negative electrodes of the present invention has high compacted density and good processing performance. The negative electrode material has simple preparation technique and low raw material cost, is environmentally friendly, and causes no pollution.

19 Claims, 2 Drawing Sheets

(51) Int. Cl.

| | | |
|---|---|---|
| *B01J 13/04* | (2006.01) | |
| *C22F 1/02* | (2006.01) | |
| *C22F 1/16* | (2006.01) | |
| *H01M 4/04* | (2006.01) | |
| *H01M 4/133* | (2010.01) | |
| *H01M 4/36* | (2006.01) | |
| *H01M 4/38* | (2006.01) | |
| *H01M 4/48* | (2010.01) | |
| *H01M 4/62* | (2006.01) | |
| *H01M 4/66* | (2006.01) | |
| *H01M 4/70* | (2006.01) | |

(52) U.S. Cl.
CPC ......... *H01M 4/049* (2013.01); *H01M 4/0421* (2013.01); *H01M 4/0471* (2013.01); *H01M 4/133* (2013.01); *H01M 4/366* (2013.01); *H01M 4/386* (2013.01); *H01M 4/387* (2013.01); *H01M 4/483* (2013.01); *H01M 4/623* (2013.01); *H01M 4/625* (2013.01); *H01M 4/661* (2013.01); *H01M 4/70* (2013.01); *H01M 10/0525* (2013.01)

(58) Field of Classification Search
CPC ...... H01M 4/133; H01M 4/366; H01M 4/386; H01M 4/387; H01M 4/483; H01M 4/583; H01M 4/587; H01M 4/623; H01M 4/625; H01M 4/661; H01M 4/70
See application file for complete search history.

(56) References Cited

U.S. PATENT DOCUMENTS

| | | | | |
|---|---|---|---|---|
| 2010/0273058 A1* | 10/2010 | Lee | ....................... | H01M 4/133 |
| | | | | 429/225 |
| 2010/0297500 A1* | 11/2010 | Kawai | ................. | H01M 4/0404 |
| | | | | 429/231.8 |
| 2012/0264020 A1 | 10/2012 | Burton | | |

FOREIGN PATENT DOCUMENTS

| | | |
|---|---|---|
| CN | 103474667 A | 12/2013 |
| CN | 103560233 A | 2/2014 |
| CN | 103708437 A | 4/2014 |
| CN | 104091934 A | 10/2014 |
| JP | 2015106563 | 6/2015 |

OTHER PUBLICATIONS

International Search Report dated Dec. 16, 2015 in corresponding International Application No. PCT/CN2015/087266.

* cited by examiner

MULTIPLE-ELEMENT COMPOSITE MATERIAL FOR ANODES, PREPARATION METHOD THEREFOR, AND LITHIUM-ION BATTERY HAVING SAME

CROSS-REFERENCE TO RELATED APPLICATIONS

This application is the US National Stage of International Application PCT/CN2015/087266 which was filed Aug. 17, 2015, and published as WO2016/008455, which derives priority from Chinese App. No. 201410340471.7 filed Jul. 17, 2014 and which are hereby incorporated by reference.

TECHNICAL FIELD

The present invention relates to the field of anode material of lithium-ion battery, specifically to a multi-composite anode material, a method for preparing the same, as well as a lithium-ion battery having the same.

BACKGROUND ART

Owing to advantages such as high working voltage, long cycle service life, no memory effect, little self-discharge, being environmentally friendly and the like, lithium-ion battery has been widely applied in portable electronic products and electric vehicles. At present, commercial lithium-ion battery is mainly made of graphite-type anode materials. However, the theoretical specific capacity thereof is only 372 mAh/g, and cannot meet the requirements of future lithium-ion battery on high-energy density. It is reported at home and abroad that metal elements, metal oxides and metal alloy compounds capable of forming alloys with lithium, such as Si, Sn, Ge, Pb, SiO, SnO, SbSn, $Mg_2Si$ and the like, have higher specific capacity. However, the battery capacity of these materials decreases rapidly during the use. Thus, the actual applications thereof are limited to a certain extent.

It is deemed by analyses that large expansion and contraction of the volume result in material damage and crushing during delithiation and lithiation of metal elements, alloys and metal oxides materials for anodes, which is the main cause for rapid decrease of the material capacity. Thus it has an important meaning for increasing the cycling stability of alloys and metal oxides materials for anodes to inhibit the volume expansion of the materials and to increase the structural stability of the materials. Currently, the volume expansion of the materials is improved primarily by nanocrystallization, alloying and multi-composition (or composing with active or non-active materials).

CN103199223A discloses a Cu—Cr—Si ternary anode material, and a process for preparing the same. It discloses mixing copper powder, chromium powder and silicon powder and calcining to prepare alloy ingots, then pulverizing to obtain Cu—Cr—Si ternary alloy powder having a micron size or less. The resultant materials have a higher capacity and a better cycling performance. However, the continuous phase formed by silicon and chromium in the ternary material prepared by such process still has a large size, and does not homogeneously disperse copper, chromium and silicon. CN103560249A discloses a multi-composite anode material and a process for preparing the same, comprising adding silicon powder, carbon nano-tube, expanded graphite into a polyvinyl alcohol or polyethylene glycol water system, then stirring-drying and calcining to obtain a multi-composite material consisting of nano-silicon powder, carbon nano-tube, expanded graphite and amorphous carbon. Such composite material has a better electroconductivity and a high capacity. However, nano-silicon powder is hard to be sufficiently dispersed during the preparation, so as to result in a lower initial charge-discharge efficiency of such material.

Therefore, it is a technical challenge in the lithium-ion battery field to develop a multi-composite anode material having a high electroconductivity, a high capacity, a high initial charge-discharge efficiency and a better cycling stability.

SUMMARY

As for the inefficiencies in the prior art, one object of the present invention lies in providing a multi-composite anode material having a high electroconductivity, a high capacity and a high initial coulombic efficiency and an excellent cycling performance.

In order to achieve such object above, the present invention employs the following technical solution.

A multi-composite anode material, characterized in that the anode material is a multi-shell core-shell structure; the inner core consists of graphite and nano-active material coated on the surface of the graphite; the outer layers of the inner core comprise, in order: a first shell of an electrically conductive carbon material, a second shell of a nano-active material, and a third shell of a coating layer for the electrically conductive carbon material.

For the multi-composite anode material of the present invention, the anode material contains from 1 to 40 wt. % of a nano-active material, from 30 to 80 wt. % of graphite, and from 10 to 50 wt. % of an electrically conductive carbon material.

Preferably, the multi-composite anode material has a median particle size of from 5.0 to 45.0 μm, preferably from 8.0 to 35.0 μm, more preferably from 10.0 to 25.0 μm.

Preferably, the multi-composite anode material has a specific surface area of from 1.0 to 20.0 $m^2/g$, preferably from 1.5 to 8.0 $m^2/g$.

Preferably, the multi-composite anode material has a powder compacted density of from 1.0 to 2.0 $g/cm^3$, preferably from 1.1 to 1.7 $g/cm^3$.

Preferably, the graphite is one selected from the group consisting of natural crystalline graphite, natural aphanitic graphite, natural crystalline vein graphite, artificial graphite and conductive graphite, or a combination of at least two selected therefrom.

Preferably, the graphite has one shape selected from the group consisting of flake, spheroidal block and spherical shape, or a combination of at least two selected therefrom.

Preferably, the graphite has a median particle size of from 5.0 to 30.0 μm, preferably from 8.0 to 25.0 μm, more preferably from 10.0 to 20.0 μm.

Preferably, the nano-active material is a material having electrochemical activity for lithium, preferably one selected from the group consisting of active metal elements, active metalloid elements, metal oxides, metal alloy compounds, or a combination of at least two selected therefrom, more preferably one selected from the group consisting of silicon simple substance, tin simple substance, antimony simple substance, germanium simple substance, aluminum simple substance, magnesium simple substance, zinc simple substance, gallium simple substance, cadmium simple substance, titanium oxide, silicon oxide, tin oxide, cobalt oxide, iron oxide, copper oxide, manganese oxide, nickel oxide, tin-antimony alloy, indium-antimony alloy, silver-antimony alloy, aluminum-antimony alloy, silver-tin alloy and Si—Mg compound, or a combination of at least two selected therefrom.

preferably, the nano-active material has a median particle size of from 30.0 to 300.0 nm, preferably from 25.0 to 250.0 nm, more preferably from 20.0 to 200.0 nm.

Preferably, the electrically conductive carbon material is one selected from the group consisting of carbon nanotube, graphene, conductive graphite, carbon fiber, nano-graphite, conductive carbon black and carbon from pyrolysis of organic compounds, or a combination of at least two selected therefrom.

The second object of the present invention lies in providing a method for preparing the multi-composite anode material of the present invention, comprising the steps of (1) coating a nano-active material on graphite surface to obtain a first precursor;

(2) conducting surface composite modification to the first precursor using an electrically conductive carbon material to obtain a second precursor;

(3) coating a nano-active material on the surface of the second precursor to obtain a third precursor;

(4) modifying the third precursor by coating to obtain a multi-composite anode material.

Preferably, step (5) is proceeded after step (4), comprising pulverizing the composite material obtained in step (4), sieving and degaussing to obtain a multi-composite anode material having a median particle size of from 5.0 to 45.0 μm.

Preferably, the coating in steps (1) and (3) is one selected from the group consisting of vapor phase coating method, liquid phase coating method or solid phase coating method, or a combination of at least two selected therefrom.

As for the preparation method of the present invention, the vapor phase coating method comprises the steps of placing the graphite in step (1) or the second precursor in step (2) into a rotary furnace, and feeding protective gas, heating to 600 to 1500° C., feeding a nano-active material steam, keeping the temperature for 0.5 to 10.0 h and then cooling to room temperature to obtain the first precursor in step (1) or the third precursor in step (3).

Preferably, the nano-active material steam is obtained by subliming nano-active material or pyrolyzing organic gas.

Preferably, the rotary furnace has a speed of 0.1-5.0 r/min.

Preferably, the heating rate is from 1.0 to 20.0° C./min.

Preferably, the flow rate of the nano-active material steam is from 0.1-1.0 L/min.

Preferably, the liquid phase coating method comprises the steps of dispersing the nano-active material, a dispersing agent, the graphite in step (1) or the second precursor in step (2) in an organic solvent, and drying to obtain the first precursor in step (1) or the third precursor in step (3).

Preferably, the dispersing agent is one selected from the group consisting of sodium tripolyphosphate, sodium hexametaphosphate, sodium pyrophosphate, triethylhexyl phosphoric acid, sodium lauryl sulfate, methyl amyl alcohol, cellulose derivatives, polyacrylamide, guar gum, fatty acid polyglycol ester, cetyl trimethyl ammonium bromide, polyethylene glycol p-isooctyl phenyl ether, polyacrylic acid, polyvinyl pyrrolidone, polyoxyethylene sorbitan monooleate, p-ethylbenzoic acid and polyetherimide, a combination of at least two selected therefrom.

Preferably, the organic solvent is one selected from the group consisting of alcohols, ketones and ethers, or a combination of at least two selected therefrom.

Preferably, the solid phase coating method comprises the step of placing the nano-active material and the graphite in step (1) or the second precursor in step (2) into a fusion machine for fusion to obtain the first precursor in step (1) or the third precursor in step (3).

Preferably, the fusion machine has a rotating speed of 500-3000 r/min, and the gap width of the cutting tool is from 0.01 to 0.5 cm.

Preferably, the fusion time is no less than 0.5 h.

As for the preparation method of the present invention, the surface composite modification in step (2) is carried out by mechanical and physical modification, vapor phase chemical modification or liquid phase chemical modification.

Preferably, the mechanical and physical modification comprises the steps of placing the electrically conductive carbon material and the first precursor in step (1) in a fusion machine for fusion, then placing in a reactor, feeding a protective gas, heating to 600-1200° C., keeping the temperature for 0.5-10.0 h, cooling to room temperature to obtain the second precursor in step (2).

Preferably, the fusion machine has a rotating speed of 500-3000 r/min.

Preferably, the fusion machine has a gap width of the cutting tool of 0.01-0.5 cm.

Preferably, the fusion time is no less than 0.5 h.

As for the preparation method of the present invention, the vapor phase chemical modification comprises the steps of placing the first precursor in step (1) into a rotary furnace, feeding a protective gas, heating to 600-1200° C., feeding an organic carbon source gas, keeping the temperature for 0.5-10.0 h, cooling to room temperature to obtain the second precursor in step (2).

Preferably, the organic carbon source gas is one selected from the group consisting of hydrocarbons and/or aromatic hydrocarbon derivatives having 1 to 3 rings, or a combination of at least two selected therefrom, preferably one selected from the group consisting of methane, ethylene, acetylene, benzene, toluene, xylene, styrene and phenol, or a combination of at least two selected therefrom.

Preferably, the rotary furnace has a rotating speed of 0.1-5.0 r/min.

Preferably, the organic carbon source gas has a flow rate of 0.1-2.0 L/min.

As for the preparation method of the present invention, the liquid phase chemical modification comprises the steps of dispersing the first precursor in step (1) and an organic matter in an organic solvent system, drying, and then placing in a reactor, feeding a protective gas, heating to 600-1200° C., keeping the temperature for 0.5-10.0 h, cooling to room temperature, to obtain the second precursor in step (2).

Preferably, the organic solvent is one selected from the group consisting of ethers, alcohols and ketones, or a combination of at least two selected therefrom.

Preferably, the organic matter is one selected from the group consisting of polymers, saccharides, organic acids, asphalts and polymer materials, or a combination of at least two selected therefrom, preferably one selected from the group consisting of epoxy resin, phenol resin, furfural resin, urea resin, polyvinyl alcohol, polyvinyl chloride, polyethylene glycol, polyethylene oxide, polyvinylidene fluoride, acrylic resin and polyacrylonitrile, or a combination of at least two selected therefrom.

Preferably, the reactor in the mechanical and physical modification, the rotary furnace in the vapor phase chemical modification and the reactor in the liquid phase chemical modification has a heating rate of 0.5-20.0° C./min.

Preferably, the reactor is one selected from the group consisting of vacuum furnace, box furnace, rotary furnace, roller kiln, pushed slab kiln or tube furnace.

As for the preparation method of the present invention, the coating modification in step (4) is carried out by vapor phase coating modification, liquid phase coating modification or solid phase coating modification.

As for the preparation method of the present invention, the vapor phase coating modification comprises the steps of placing the third precursor in step (3) into a rotary furnace, feeding a protective gas, heating to 600-1200° C., feeding an organic carbon source gas, keeping the temperature for 0.5-10.0 h, cooling to room temperature to obtain the multi-composite anode material in step (4).

Preferably, the organic carbon source gas is one selected from the group consisting of hydrocarbons and/or aromatic hydrocarbon derivatives having 1 to 3 rings, or a combination of at least two selected therefrom, preferably one selected from the group consisting of methane, ethylene, acetylene, benzene, toluene, xylene, styrene and phenol, or a combination of at least two selected therefrom.

Preferably, the rotary furnace has a rotating rate of 0.1-5.0 r/min.

Preferably, the organic carbon source gas has a flow rate of 0.1-2.0 L/min.

As for the preparation method of the present invention, the liquid phase coating modification comprises the steps of dispersing the third precursor in step (3) and an organic matter in an organic solvent system, drying, and then placing in a reactor, feeding a protective gas, heating to 600-1200° C., keeping the temperature for 0.5-10.0 h, cooling to room temperature, to obtain the multi-composite anode material in step (4).

Preferably, the organic solvent is one selected from the group consisting of ethers, alcohols and ketones, or a combination of at least two selected therefrom.

As for the preparation method of the present invention, the solid phase coating modification comprises the steps of placing the third precursor in step (3) and an organic matter into a VC mixer, mixing and then placing in a reactor, feeding a protective gas, heating to 600-1200° C., keeping the temperature for 0.5-10.0 h, cooling to room temperature, to obtain the multi-composite anode material in step (4).

Preferably, the VC mixer has a rotating rate of 500-3000 r/min.

Preferably, the mixing lasts for no less than 0.5 h.

As for the preparation method of the present invention, the rotary furnace in the vapor phase coating modification, the reactor in the liquid phase coating modification, the reactor in the solid phase coating modification have a heating rate of 0.5-20.0° C./min.

Preferably, the reactor is one selected from the group consisting of vacuum furnace, box furnace, rotary furnace, roller kiln, pushed slab kiln or tube furnace.

Preferably, the organic matter is one selected from the group consisting of polymers, saccharides, organic acids, asphalts and polymer materials, or a combination of two selected therefrom, preferably one selected from the group consisting of epoxy resin, phenol resin, furfural resin, urea resin, polyvinyl alcohol, polyvinyl chloride, polyethylene glycol, polyethylene oxide, polyvinylidene fluoride, acrylic resin and polyacrylonitrile, or a combination of at least two selected therefrom.

Preferably, the organic carbon source is in a powder form and has a median particle size of 0.1-25.0 μm, particularly preferably 0.5-8.0 μm.

As for the preparation method of the present invention, the protective gas is one selected from the group consisting of nitrogen, helium, neon, argon and xenon, or a combination of at least two selected therefrom.

The third object of the present invention lies in providing a lithium-ion battery, characterized in that the anode pole piece thereof is obtained by mixing the multi-composite anode material of the present invention, a conductive agent and a binder in a mass percent of 91-94:1-3:3-6 in a solvent, coating on a copper foil current collector, and drying under vacuum atmosphere.

Preferably, the positive electrode active material of the positive electrode pole piece of the lithium-ion battery is one selected from the group consisting of ternary materials, lithium-rich materials, lithium cobalt oxide, lithium nickelate, spinel lithium manganate, layered lithium manganate and lithium iron phosphate, or a combination of at least two selected therefrom.

Preferably, the conductive agent is graphite powder and/or nano-conductive liquid.

Preferably, the nano-conductive liquid consists of 0.5-20 wt. % of nano-carbon material and a dispersing solvent.

Preferably, the nano-carbon material is one selected from the group consisting of graphene, carbon nanotube, carbon nanofiber, fullerene, carbon black and acetylene black, a combination of at least two selected therefrom.

Preferably, the number of the graphite sheet layers of the graphene is between 1 and 100.

Preferably, the carbon nanotube and carbon nanofiber have a diameter of 0.2-500 nm.

Preferably, the fullerene, carbon black and acetylene black have a particle size of 1-200 nm.

Preferably, the binder is one selected from the group consisting of polyimide resin, acrylic resin, polyvinylidene fluoride, polyvinyl alcohol, sodium carboxymethyl cellulose and styrene-butadiene rubber, or a combination of at least two selected therefrom.

Preferably, the lithium-ion battery is conventional types of aluminum, steel, or soft package lithium-ion battery.

As compared to the prior art, the present invention discloses successfully preparing a multi-shell core-shell multi-composite anode material by combining coating-processing technology, surface composite modification with coating modification technology. The present invention discloses coating nano-active material onto graphite surface to form an inner core, recombining on the inner core surface conductive carbon to form a first shell, then coating nano-active material onto the surface of the first shell to form a second shell, finally homogeneously coating the second shell to obtain a multi-composite anode material having high performance. The nano-active material is homogeneously coated on the surface of graphite particles as buffer matrix, and secondly coated on the surface of the conductive carbon layer as buffer layer and conductive layer, so as to achieve high capacity and high dispersion of the nano-active material and greatly increase the specific capacity, cycling performance (having a capacity retention ratio of 90% or more after 400 cycles) and initial efficiency (higher than 90%). In addition, the multi-composite anode material of the present invention has a high compacted density, a better processing performance. The anode material has a simple preparation technology and a low raw material cost, and is environmentally friendly without pollution.

DETAILED DESCRIPTION

In order to better understand the present invention, the present invention lists the following examples. Those skilled in the art shall know that the examples are only used for understanding the present invention, rather than the specific limits to the present invention.

EXAMPLE 1

Spheroidal natural graphite having a particle size of 5-20 μm, Si having a particle size of 30-250 nm and polyoxyethylene sorbitan monooleate in a mass ratio of 80:5:0.5 were dispersed in propanol, rotary-evaporated and dried to obtain a first precursor. The first precursor and graphene in a mass ratio of 85:5 were placed in a fusion machine, and fused for 0.5 h, and then placed in a box furnace, wherein the rotating speed was adjusted to 3000 r/min; the gap width of the cutting tool was 0.01 cm. Argon was fed, and the temperature was increased to 600° C. at a rate of 0.5° C./min, and kept for 10.0 h. Natural cooling was carried out to room temperature to obtain a second precursor. The second precursor, Si having a particle size of 30-250 nm and fatty acid polyglycol esters in a mass ratio of 90:5:0.2 was dispersed in ethanol, spray-dried to obtain a third precursor. The third precursor and asphalt powder having a particle size of 0.1-6.0 m in a mass ratio of 95:20 were placed in a VC high-efficiency mixer, wherein the rotating speed was adjusted to 3000 r/min, mixed for 0.5 h, and then placed in a box furnace. Argon was fed, and the temperature was increased to 1050° C. at a rate of 10° C./min, and kept for 10.0 h. Natural cooling was carried out to room temperature, and then pulverizing, sieving and degaussing were proceeded to obtain a novel high-capacity multi-composite anode material having a particle size of 5.0-45.0 m.

Figure 1:
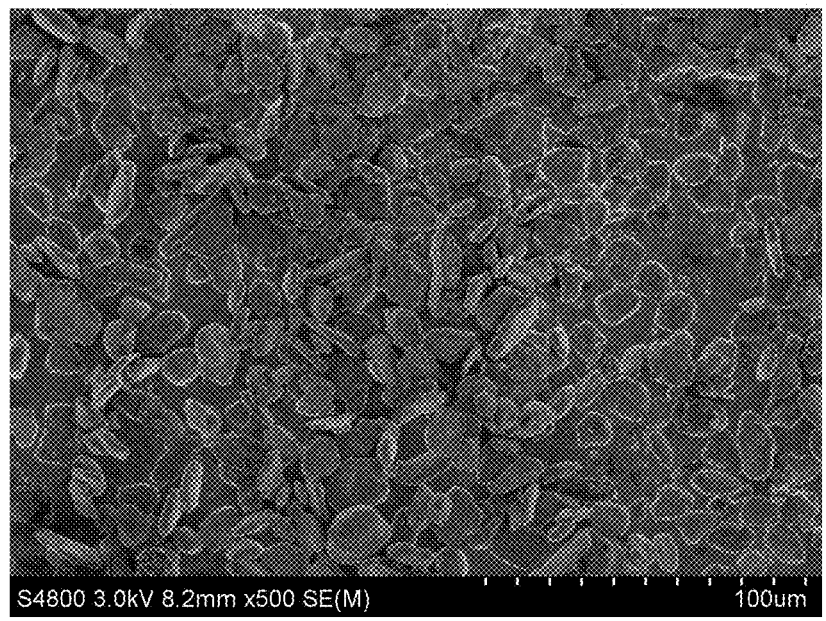
FIG. 1 shows an electron microscope graph of the composite anode material in Example 1 of the present invention.
Figure 2:
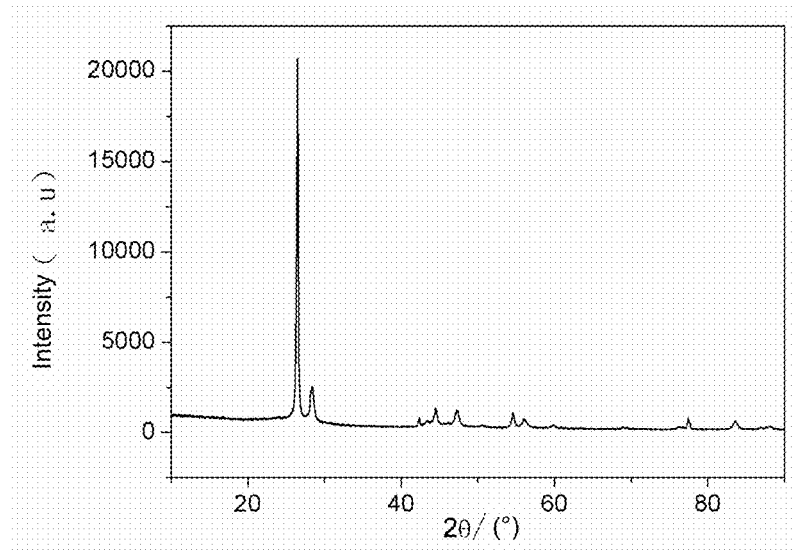
FIG. 2 shows a XRD graph of the composite anode material in Example 1 of the present invention.
Figure 3:
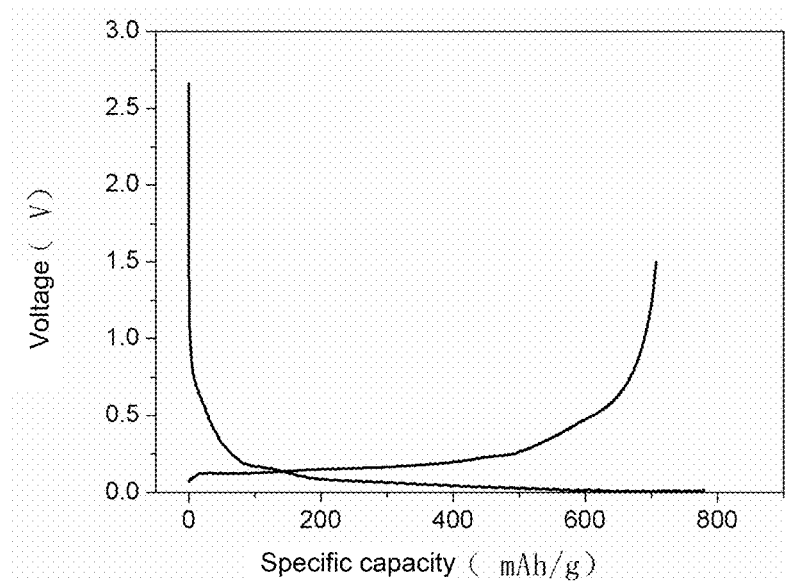
FIG. 3 shows an initial charge-discharge curve of the composite anode material in Example 1 of the present invention.
Figure 4:
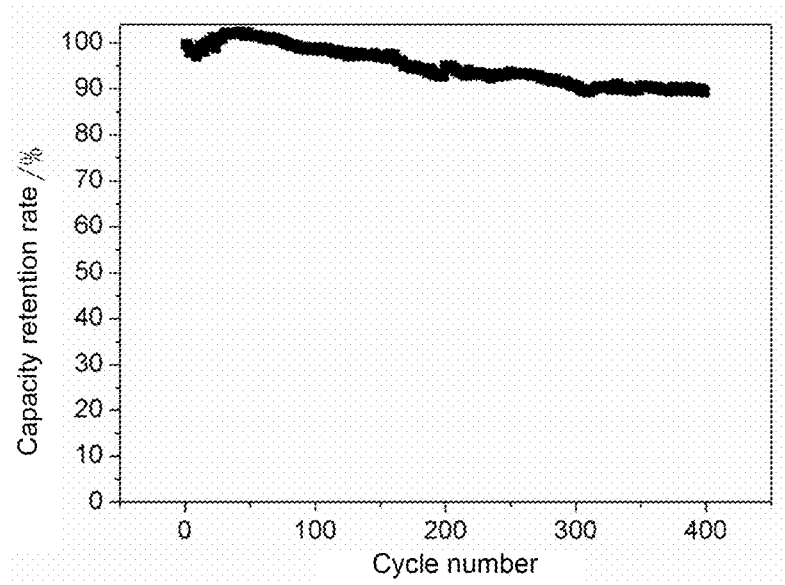
FIG. 4 shows a cycling performance curve of the composite anode material in Example 1 of the present invention.

FIG. 1 shows an electron microscope graph of the composite anode material in the present Example. FIG. 2 shows a XRD graph of the composite anode material in the present Example. FIG. 3 shows an initial charge-discharge curve of the composite anode material in the present Example. FIG. 4 shows a cycling performance curve of the composite anode material in the present Example.

It can be seen from FIG. 1 that the prepared material has a compact surface coating; it can be seen from FIG. 2 that the material has diffraction peaks of graphite and silicon; it can be seen from FIGS. 3 and 4 that the material has a higher initial charge-discharge efficiency and an excellent cycling performance.

EXAMPLE 2

Spherical artificial graphite having a particle size of 10.0-30.0 m was placed in a rotary furnace, and the rotating speed was adjusted to 0.1 r/min. Argon was fed, and the temperature was increased to 800° C. at a rate of 1.0° C./min. Then silane gas was fed in a gas flow rate of 0.5 L/min. The temperature was kept for 5.0 h, and then natural cooling was proceeded to room temperature to obtain a first precursor. The first precursor and polyvinyl alcohol in a mass ratio of 80:20 was dispersed in methanol, spray-dried and then placed in a tube furnace. Argon was fed, and the temperature was increased to 900° C. at a rate of 0.5° C./min, and kept for 0.5 h. Natural cooling was carried out to room temperature to obtain a second precursor. The second precursor was placed in a rotary furnace, and the rotating rate was adjusted to 0.5 r/min. Argon was fed, and the temperature was increased to 800° C. at a rate of 10.0° C./min. Then silane gas was fed in a gas flow rate of 1.0 L/min. The temperature was kept for 0.5 h, and then natural cooling was proceeded to room temperature to obtain a third precursor. The third precursor and phenolic resin in a mass ratio of 85:25 were dispersed in ethanol, spray-dried and then placed in a box furnace. Argon was fed, and the temperature was increased to 900° C. at a rate of 10.0° C./min, and kept for 10.0 h. Natural cooling was carried out to room temperature, and then pulverizing, sieving and degaussing were proceeded to obtain a novel high-capacity multi-composite anode material having a particle size of 5.0-45.0 m.

EXAMPLE 3

$SiO_{0.4}$ having a particle size of 50-300 nm and spherical natural graphite having a particle size of 10-25 μm in a mass ratio of 10:30 were placed in a fusion machine, and fused for 0.5 h, wherein the rotating speed was adjusted to 2000 r/min; the gap width of the cutting tool was 0.5 cm, to obtain a first precursor. The first precursor was placed in a rotary furnace, wherein the rotating speed was adjusted to 3.0 r/min. Argon was fed, and the temperature was increased to 700° C. at a rate of 5.0° C./min. Then acetylene gas was fed in a flow rate of 1.0 L/min, and the temperature was kept for 2.0 h. Natural cooling was carried out to room temperature to obtain a second precursor. $SiO_{0.4}$ having a particle size of 50-300 nm and the second precursor in a mass ratio of 10:80 were placed in a fusion machine, and fused for 1.0 h, wherein the rotating speed was adjusted to 3000 r/min; the gap width of the cutting tool was 0.5 cm, to obtain a third precursor. The third precursor and asphalt powder having a particle size of 5-10.0 m in a mass ratio of 80:30 were placed in a VC high-efficiency mixer, wherein the rotating speed was adjusted to 1000 r/min, mixed for 1.0 h, and then placed in a box furnace. Helium was fed, and the temperature was increased to 1200° C. at a rate of 5° C./min, and kept for 0.5 h. Natural cooling was carried out to room temperature, and then pulverizing, sieving and degaussing were proceeded to obtain a novel high-capacity multi-composite anode material having a particle size of 5.0-45.0 m.

EXAMPLE 4

SnO having a particle size of 50-200 nm and flake natural graphite having a particle size of 20.0-30.0 m in a mass ratio of 20:40 were placed in a fusion machine, and fused for 2.0 h, wherein the rotating speed was adjusted to 2000 r/min; the gap width of the cutting tool was 0.5 cm, to obtain a first precursor. The first precursor and carbon nano tube in a mass ratio of 80:10 were placed in a fusion machine, and fused for 1.0 h, wherein the rotating speed was adjusted to 2000 r/min; the gap width of the cutting tool was 0.03 cm, and then placed in a box furnace. Nitrogen was fed, and the temperature was increased to 700° C. at a rate of 10.0° C./min. The temperature was kept for 2.0 h, and natural cooling was carried out to room temperature to obtain a second precursor. The second precursor, SnO having a particle size of 50-200 nm and polyacrylamide in a mass ratio of 20:60:0.1 were dispersed in ethanol, and spray-dried to obtain a third precursor. The third precursor and polyvinyl chloride powder having a particle size of 2.0-10.0 m in a mass ratio of 80:20 were placed in a VC high-efficiency mixer, wherein the rotating speed was adjusted to 1000 r/min, mixed for 1.0 h, and then placed in a roller furnace. Nitrogen was fed, and the temperature was increased to 800° C. at a rate of 3.0° C./min, and kept for 4.0 h. Natural cooling was carried out to room temperature, and then pulverizing, sieving and degaussing were proceeded to obtain a novel high-capacity multi-composite anode material having a particle size of 18-45 m.

EXAMPLE 5

Tin-antimony alloy having a particle size of 100-300 nm and spherical natural graphite having a particle size of 10.0-20.0 m in a mass ratio of 5:60 were placed in a fusion machine, and fused for 0.5 h, wherein the rotating speed was adjusted to 3000 r/min; the gap width of the cutting tool was 0.05 cm, to obtain a first precursor. The first precursor and epoxy resin in a mass ratio of 65:15 were dispersed in ethanol, spray-dried and then placed in a tube furnace. Nitrogen was fed, and the temperature was increased to 800° C. at a rate of 0.5° C./min. The temperature was kept for 0.5 h, and natural cooling was carried out to room temperature to obtain a second precursor. The second precursor, tin-antimony alloy having a particle size of 100-300 nm and polyetherimide in a mass ratio of 80:10:0.2 were dispersed in ethanol, and spray-dried to obtain a third precursor. The third precursor and epoxy resin powder having a particle size of 5-10 μm in a mass ratio of 80:20 were placed in a VC high-efficiency mixer, wherein the rotating speed was adjusted to 800 r/min, mixed for 1.0 h, and then placed in a box furnace. Helium was fed, and the temperature was increased to 1200° C. at a rate of 5.0° C./min, and kept for 8.0 h. Natural cooling was carried out to room temperature, and then pulverizing, sieving and degaussing were proceeded to obtain a novel high-capacity multi-composite anode material having a particle size of 5.0-45.0 m.

EXAMPLE 6

Tin-antimony alloy having a particle size of 80-150 nm and spherical natural graphite having a particle size of 5.0-15.0 m in a mass ratio of 50:6 were placed in a fusion machine, and fused for 4.5 h, wherein the rotating speed was adjusted to 500 r/min; the gap width of the cutting tool was 0.2 cm, to obtain a first precursor. The first precursor and epoxy resin in a mass ratio of 50:30 were dispersed in ethanol, spray-dried and then placed in a tube furnace. Nitrogen was fed, and the temperature was increased to 1200° C. at a rate of 20° C./min. The temperature was kept for 5 h, and natural cooling was carried out to room temperature to obtain a second precursor. The second precursor, tin-antimony alloy having a particle size of 100-300 nm and polyetherimide in a mass ratio of 40:20:1 were dispersed in ethanol, and spray-dried to obtain a third precursor. The third precursor and epoxy resin powder having a particle size of 5-10 μm in a mass ratio of 50:30 were placed in a VC high-efficiency mixer, wherein the rotating speed was adjusted to 1500 r/min, mixed for 3 h, and then placed in a box furnace. Helium was fed, and the temperature was increased to 600° C. at a rate of 20° C./min, and kept for 2.0 h. Natural cooling was carried out to room temperature, and then pulverizing, sieving and degaussing were proceeded to obtain a novel high-capacity multi-composite anode material having a particle size of 5.0-45.0 m.

Comparison Example 1

A multi-composite anode material was prepared according to the substantially same process as Example 1. The difference lies in preparing no third precursor, and adding the silicon powder used for preparing the third precursor into the first precursor. A battery was prepared according to the same process as Example 1.

The following methods were adopted to test the anode materials in Examples 1-5 and Comparison Example 1.

The powder compacted density of the present invention was tested by using CARVER powder compactor, wherein the powder compacted density=the mass of the testing sample/the volume of the testing sample; the compacted density of the pole piece=(the mass of anode sheet the mass of copper foil)/(the area of pole piece×the thickness of the compacted pole piece).

The specific surface area of the material was tested by using Tristar3000 automatic specific surface area and porosity analyzer from Mike Instruments.

The particle size range of the material, and the average particle size of the raw particles were tested by using MS 2000 Malvern laser particle sizer.

The structure of the material was tested by using X-ray diffractometer X'Pert Pro, PANalytical.

The surface appearance and particle size of the samples were observed by using S4800 scanning electron microscope from Hitachi.

The electrochemical cycling performance was tested by the following method. The anode material, conductive agent and binder in a mass percent of 94:1:5 were dissolved in a solvent and mixed to control the solid content at a level of 50%, coated on a copper foil current collector, and vacuum-dried to obtain a anode pole piece. Ternary anode pole piece prepared by conventional mature process, 1 mol/L of LiPF6/EC+DMC+EMC (v/v=1:1:1) electrolyte, Celgard2400 diaphragm and shell were used to assemble 18650 cylinder battery cell according to conventional production process. The charge-discharge test of the cylinder battery was carried out on LAND battery testing system from Wuhan Jinnuo Electronics Co., Ltd. At room temperature, charge and discharge were made at 0.2C constant current, and the charge and discharge voltage was controlled within 2.75-4.2V.

The electrochemical testing results of the anode materials prepared in Examples 1-5 and Comparison Example 1 are shown in Table 1 below.

TABLE 1

| | Powder compacted density (g/cm$^3$) | Specific surface area (m$^2$/g) | Initial reversible capacity (mAh/g) | Initial coulombic efficiency (%) | Capacity retention rate after 400 cycle(%) |
|---|---|---|---|---|---|
| Example 1 | 1.46 | 3.1 | 715.3 | 90.2 | 89 |
| Example 2 | 1.31 | 1.4 | 821.3 | 89.1 | 88.3 |
| Example 3 | 1.58 | 2.1 | 453.6 | 92.6 | 90.1 |
| Example 4 | 1.38 | 2.3 | 621.3 | 88.9 | 89.5 |
| Example 5 | 1.35 | 2.7 | 535.2 | 88.7 | 89.8 |
| Example 6 | 1.52 | 2.5 | 623.4 | 88.8 | 88.6 |
| Comparison Example 1 | 1.38 | 3.8 | 693.2 | 86.5 | 65 |

It can be seen from the table above that the anode material prepared according to the process in Example 1 is superior to the anode material prepared according to the process in Comparison Example 1 in the electrochemical performance, such as initial reversible capacity, initial coulombic efficiency, cycle capacity retention rate and the like.

The applicant states that the present invention discloses the detailed processing equipments and technological process via the aforesaid examples. However, the present invention is not limited by the aforesaid detailed processing equipments and technological process. Those skilled in the art shall know that any other changes, equivalent replacement of various raw materials of the present invention, addition of auxiliary ingredients, selection of specific modes and the like all fall within the protection scope and disclosure of the present invention.

The invention claimed is:

1. A multi-composite anode material, characterized in that the anode material is a multi-shell core-shell structure having an inner core comprising outer layers; wherein the inner core consists of graphite and nano-active material coated on the surface of the graphite; the outer layers of the inner core comprise, in order: a first shell consisting of an electrically conductive carbon material, a second shell consisting of the nano-active material, and a third shell consisting of a coating layer for the electrically conductive carbon material, wherein the anode material contains from 1 to 40 wt. % of the nano-active material, from 30 to 80 wt. % of the graphite, and from 10 to 50 wt. % of the electrically conductive carbon material.

2. The multi-composite anode material according to claim 1, characterized in that the multi-composite anode material has a median particle size of from 5.0 to 45.0 µm; a specific surface area of from 1.0 to 20.0 m$^2$/g; a powder compacted density of from 1.0 to 2.0 g/cm$^3$;
the electrically conductive carbon material is one selected from the group consisting of carbon nanotube, graphene, conductive graphite, carbon fiber, nano-graphite, conductive carbon black and carbon from pyrolysis of organic compounds, and a combination of at least two selected therefrom.

3. The multi-composite anode material according to claim 1, characterized in that the nano-active material is one selected from the group consisting of active metal elements, active metalloid elements, metal oxides, metal alloy compounds, and a combination of at least two selected therefrom;
the nano-active material has a median particle size of from 30.0 to 300.0 nm.

4. A method for preparing the multi-composite anode material according to claim 1, comprising the steps of
(1) coating a nano-active material on graphite surface to obtain a first precursor;
(2) conducting surface composite modification to the first precursor using an electrically conductive carbon material to obtain a second precursor;
(3) coating the nano-active material on the surface of the second precursor to obtain a third precursor;
(4) modifying the third precursor by coating to obtain a multi-composite anode material.

5. The process according to claim 4, characterized in proceeding to step (5) after step (4) comprising pulverizing the composite material obtained in step (4), sieving and degaussing to obtain a multi-composite anode material having a median particle size of from 5.0 to 45.0 µm.

6. The process according to claim 4, characterized in that the coating in steps (1) and (3) is one selected from the group consisting of vapor phase coating method, liquid phase coating method, solid phase coating method, and a combination of at least two selected therefrom.

7. The process according to claim 6, characterized in that the vapor phase coating method comprises the steps of placing the graphite in step (1) or the second precursor in step (2) into a rotary furnace, and feeding protective gas, heating to 600 to 1500° C., feeding a nano-active material steam, keeping the temperature for 0.5 to 10.0 h and then cooling to room temperature to obtain the first precursor in step (1) or the third precursor in step (3).

8. The process according to claim 6, characterized in that the liquid phase coating method comprises the steps of dispersing the nano-active material, a dispersing agent, the graphite in step (1) or the second precursor in step (2) in an organic solvent, and drying to obtain the first precursor in step (1) or the third precursor in step (3).

9. The process according to claim 6, characterized in that the solid phase coating method comprises the step of placing the nano-active material and the graphite in step (1) or the second precursor in step (2) into a fusion machine for fusion to obtain the first precursor in step (1) or the third precursor in step (3).

10. The process according to claim 4, characterized in that the surface composite modification in step (2) is carried out by mechanical and physical modification, vapor phase chemical modification or liquid phase chemical modification.

11. The process according to claim 10, characterized in that the mechanical and physical modification comprises the steps of placing the electrically conductive carbon material and the first precursor in step (1) in a fusion machine for fusion, then placing in a reactor, feeding a protective gas, heating to 600-1200° C., keeping the temperature for 0.5-10.0 h, cooling to room temperature to obtain the second precursor in step (2).

12. The process according to claim 10, characterized in that the vapor phase chemical modification comprises the steps of placing the first precursor in step (1) into a rotary furnace, feeding a protective gas, heating to 600-1200° C., feeding an organic carbon source gas, keeping the temperature for 0.5-10.0 h, cooling to room temperature to obtain the second precursor in step (2).

13. The process according to claim 10, characterized in that the liquid phase chemical modification comprises the steps of dispersing the first precursor in step (1) and an organic matter in an organic solvent system, drying, and then placing in a reactor, feeding a protective gas, heating to 600-1200° C., keeping the temperature for 0.5-10.0 h, cooling to room temperature, to obtain the second precursor in step (2).

14. The process according to claim 4, characterized in that the coating modification in step (4) is carried out by vapor phase coating modification, liquid phase coating modification or solid phase coating modification.

15. The process according to claim 14, characterized in that the vapor phase coating modification comprises the steps of placing the third precursor in step (3) into a rotary furnace, feeding a protective gas, heating to 600-1200° C., feeding an organic carbon source gas, keeping the temperature for 0.5-10.0 h, cooling to room temperature to obtain the multi-composite anode material in step (4).

16. The process according to claim 14, characterized in that the liquid phase coating modification comprises the steps of dispersing the third precursor in step (3) and an organic matter in an organic solvent system, drying, and then placing in a reactor, feeding a protective gas, heating to 600-1200° C., keeping the temperature for 0.5-10.0 h, cooling to room temperature, to obtain the multi-composite anode material in step (4).

17. The process according to claim 14, characterized in that the solid phase coating modification comprises the steps of placing the third precursor in step (3) and an organic matter into a VC mixer, mixing and then placing in a reactor, feeding a protective gas, heating to 600-1200° C., keeping the temperature for 0.5-10.0 h, cooling to room temperature, to obtain the multi-composite anode material in step (4).

18. A lithium-ion battery, characterized in that the anode pole piece thereof is obtained by mixing the multi-composite anode material of claim 1, a conductive agent and a binder in a mass percent of 91-94:1-3:3-6 in a solvent, coating on a copper foil current collector, and drying under vacuum atmosphere.

19. The lithium-ion battery according to claim 18, characterized in that the conductive agent is graphite powder and/or nano-conductive liquid;
   the nano-conductive liquid consists of 0.5-20 wt. % of nano-carbon material and a dispersing solvent;
   the nano-carbon material is one selected from the group consisting of graphene, carbon nanotube, carbon nanofiber, fullerene, carbon black and acetylene black, a combination of at least two selected therefrom;
   the number of the graphite sheet layers of the graphene is between 1 and 100;
the carbon nanotube and carbon nanofiber have a diameter of 0.2-500 nm;
   the fullerene, carbon black and acetylene black have a particle size of 1-200 nm.

* * * * *